Nov. 12, 1957 M. KAPLAN 2,813,260

MAGNETIC DEVICE

Filed Oct. 29, 1954 2 Sheets-Sheet 1

INVENTOR.
MARTIN KAPLAN
BY Morris Rabkin
ATTORNEY

Nov. 12, 1957 M. KAPLAN 2,813,260

MAGNETIC DEVICE

Filed Oct. 29, 1954 2 Sheets-Sheet 2

INVENTOR.
MARTIN KAPLAN
BY Morris A. Rabin
ATTORNEY

United States Patent Office 2,813,260

Patented Nov. 12, 1957

2,813,260

MAGNETIC DEVICE

Martin Kaplan, Collingswood, N. J., assignor to Radio Corporation of America, a corporation of Delaware Application October 29, 1954, Serial No. 465,633

12 Claims. (Cl. 340—174)

This invention relates to magnetic devices, and particularly to magnetic devices for performing storage or switching functions.

Magnetic systems have been developed that employ magnetic cores made of material having a substantially rectangular hysteresis characteristic. Binary information may be stored in such magnetic cores by means of the residual flux of the cores which may assume either one of two directions. These magnetic systems have the advantages of indefinite life, small size, relatively small power consumption, and the ability to store information indefinitely.

Among the circuits generally employed in digital computers or other digital information handling systems is the bistable trigger or flip-flop circuit. This circuit responds to input signals to assume two different states which may represent the binary digits one and zero, respectively. One common use of such trigger circuits is in a binary counter which is made up of a plurality of flip-flops connected in cascade.

It is among the objects of this invention to provide:

A new and improved magnetic device that may be employed in digital systems;

A new and improved device having a binary mode of operation that utilizes magnetic cores as the basic circuit element;

A new and improved magnetic trigger circuit that is economical in the components required;

A new and improved binary counter in which magnetic cores are the basic circuit elements.

In accordance with this invention, a magnetic element having two substantially stable magnetic states is employed. Means are provided for successively applying to the magnetic element pairs of magnetizing forces. Each first force of a pair tends to drive the element from the first magnetic state to the second state, and each second force is of opposite polarity tending to drive the element back to its first state. The second force occurs a predetermined time after the first force of the same pair. A means linked to the magnetic element responds to the element being driven to the second state to inhibit the effect of the second force. Consequently, if the first force of a pair drives the element to the second state, the second force of that pair is inhibited from returning the core to its first state. The first force of the next pair does not produce any substantial effect on the magnetic element since it is already in the second state. Consequently, the second force is not inhibited and it returns the element to its first state. The device of this invention may be employed as a trigger circuit, and a binary counter may be provided by connecting a plurality of these devices in cascade.

The foregoing and other objects, the advantages and novel features of this invention, as well as the invention itself, both as to its organization and mode of operation, may be best understood from the following description when read in connection with the accompanying drawing, in which like reference numerals refer to like parts, and in which.

Figures 1, 2, 3, 5, 6, 7:
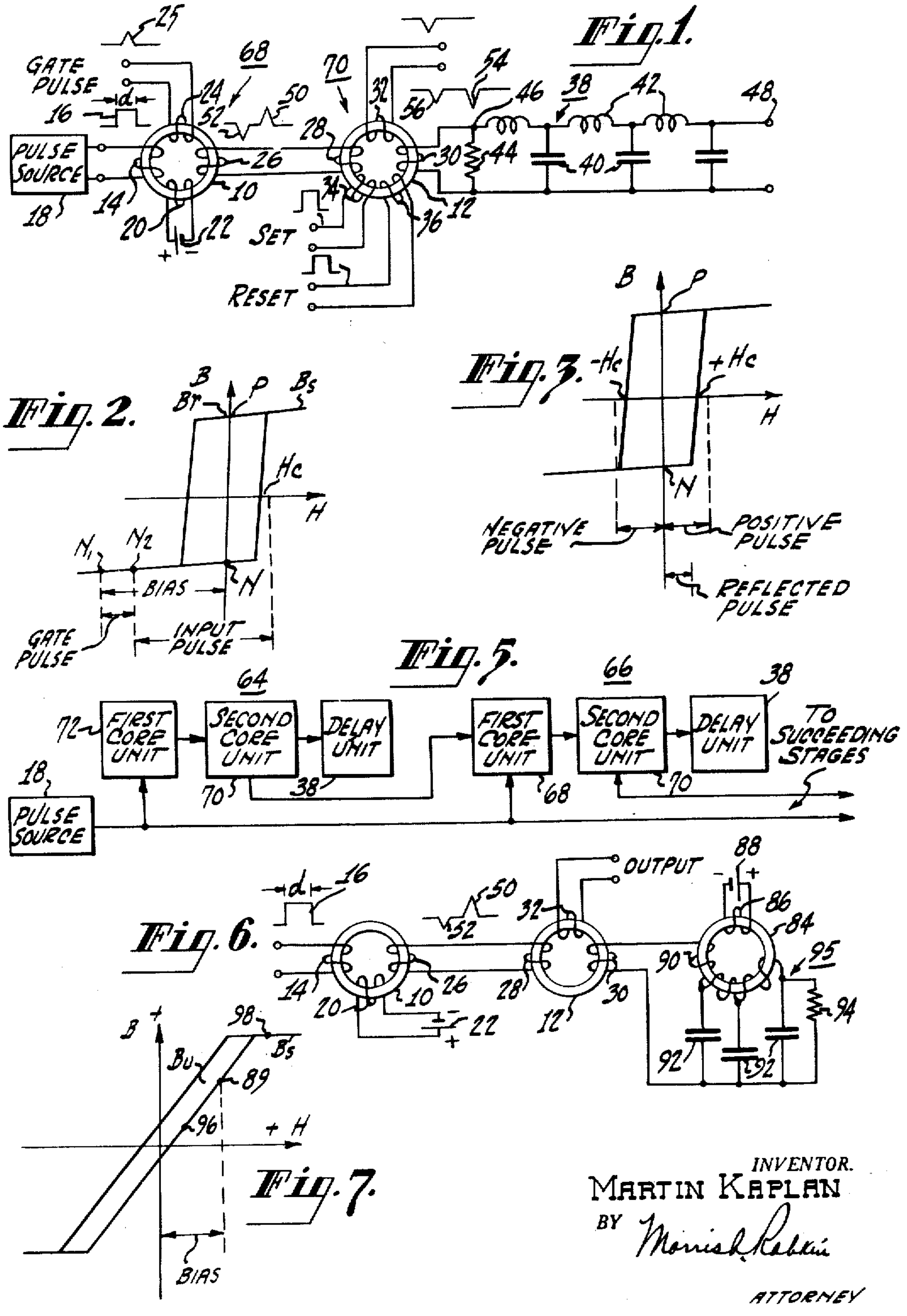
Figure 1 is a schematic circuit diagram of a bistable trigger circuit embodying this invention.
Figure 2 is an idealized graph of the magnetic hysteresis curve of one of the magnetic cores in the circuit of Figure 1.
Figure 3 is an idealized graph of the magnetic hysteresis curve of another core in the circuit of Figure 1.
Figure 5 is a schematic block diagram of a binary counter employing trigger circuits of the type shown in Figure 1.
Figure 6 is a schematic circuit diagram of a modified trigger circuit embodying this invention.
Figure 7 is an idealized graph of the magnetic hysteresis curve of a third core in the circuit of Figure 6.

In the circuit of Figure 1, two magnetic elements or cores 10, 12 are employed. The first core 10 may be made of a material having a substantially rectangular hysteresis curve as shown in Figure 2. Linked to the first core 10 are four windings: an input winding 14 which receives energizing pulses 16 from a pulse source 18; a biasing winding 20 which has a direct current (D. C.) continuously applied from an appropriate source shown as a battery 22; a gate winding 24 which receives gating pulses 25; and an output winding 26. The material of the second core 12 preferably has a substantially rectangular hysteresis curve as shown in Figure 3. Linked to the second core 12 is a first winding 28 which is connected to the output winding 26 of the first core 10, a second winding 30, an output winding 32, a set winding 34 and a reset winding 36. The second winding 30 is connected to a delay means shown as an electrical delay line 38 formed of lumped capacitances 40 and inductances 42 with an appropriate matching impedance 44 connected across its input 46. The delay line 38 is terminated in an open circuit at its output 48 or is terminated by an impedance (not shown) very much larger than the characteristic impedance of the delay line 38 so that it may be considered to be open-circuited in effect. The pulses 16 generated by the pulse source are rectangular pulses of uniform duration $d$, with the time between pulses being greater than $d$. The delay provided in traversing the delay line 38 in one direction is $$\frac{d}{2}$$

Magnetic core materials, such as ferrites characterized by the idealized graphs of Figures 2 and 3, exhibit a residual flux density $B_r$ substantially equal to the saturation flux density $B_s$. Once driven to a saturated state, the core tends to remain in the corresponding state of residual flux P or N. When acted on by a magnetizing force in the opposite direction and in excess of the threshold coercive force $H_c$, the core is driven to the opposite state of saturation.

The first core 10 is biased by the winding 20 and source 22 to the N state of saturation, point $N_1$ in Figure 2. Coincidence of the positive gate pulse 25 and the positive input pulse 16 is required to provide a large enough magnetizing force to overcome the bias and drive the core 10 from state N to state P. When the first core 10 is so driven from N to P, a positive-going pulse 50 is induced in the output winding 26 at a time corresponding to the leading edge of the input pulse 16. The idealized waveforms of the first core outputs are shown in the second line of Figure 4. For the duration of the input pulse 16 the core 10 remains in the state P. At the trailing edge of the pulse 16, a time $d$ later, the bias returns the core 10 to state N inducing a negative-going pulse 52 in the output winding 26. The first core circuit acts as a differentiating circuit to provide a pair of opposite-polarity pulses 50 and 52 for each gated input pulse 16. The output pulses 50, 52 are positive and negative, in that order, and are spaced a time *d* corresponding to the duration of the positive input pulse 16. The rectangular hysteresis curve of the first core material results in relatively uniform flux changes and, therefore, tends to provide more uniform output waveforms.

The second core 12 is assumed to be initially in state P. The positive-going output pulse 50 drives the second core 12 further to saturation in the P state. Due to the substantially rectangular hysteresis characteristic of the core material, there is but a negligible voltage induced in the second winding 30 and the output winding 32 of the second core 12. The waveforms at the delay line input 46 and at the output winding 32 are shown in the third and fourth lines, respectively, of Figure 4. The second output pulse 52, which is negative going, drives the second core 12 from state P to state N. As a result, negative-going pulses are induced in the second core output winding 32 and in the second winding 30. The negative pulse 54 in the second winding 30 travels down the delay line 38, is reinforced at the open-circuited output end 48, and is reflected back with the same polarity to the input 46 at a time *d* after it was induced. The polarity of the reflected pulse 56 is such as to drive the core further to the N state of saturation. Thus, the reflected pulse 56 has substantially no effect on the second core 12.

The next input pulse 58 produces another pair of opposite-polarity pulses 50, 52 which are applied to the first winding 28 of the second core 12. The positive-going pulse 50 drives the core 12 from state N to state P inducing positive pulses in the second core output winding 32 and second winding 30. The positive pulse 60 (Figure 4) at the second winding 30 travels down the delay line 38 and is reflected back with the same polarity. At time *d* after it is induced, the reflected pulse 62 is applied to the second winding 30, and, at the same time, the negative-going pulse 52 of the pulse pair is applied to the first winding 28. The magnetizing force produced by the pulse 52 in the first winding 28, which tends to return the core to state N, is opposed by the magnetizing force produced by the reflected pulse 62 in the second winding 30. The reflected pulse 62 may be somewhat attenuated in the delay line 38. If the magnetizing force produced by the reflected pulse 62 is only half that produced by the pulse 52, the net magnetizing force is not in excess of the coercive force $H_c$, and the core 12 remains in the P state.

To summarize: if the first positive-going pulse 50 of a pulse pair drives the core 12 from state N to state P, the action of the second pulse 52 of that pair is inhibited by the pulse 62 reflected by the delay line 38. However, if the core is already in state P when the positive-going pulse 50 is applied, the pulse 50 does not change the core state. Any voltage induced in the second winding 30 by the pulse 50 is of negligible amplitude and, when reflected back by the delay line 38, is insufficient to oppose pulse 52. Therefore, pulse 52 reverses the core 12 to state N.

The circuit of Figure 1 operates as a triggerable flip-flop since successive input pulses 16, 58 of the same polarity respectively drive the second core 12 to opposite-stable magnetic states and produce opposite polarity output pulses. The second core may be set or reset by positive-going pulses on the set and reset windings 34 and 36, respectively. Such pulses on the set and reset windings 34 and 36 drive the core 12 to states N and P, respectively. This invention is not restricted to the use of any particular type of circuit for producing pairs of positive and negative pulses 50, 52 of the form specified above. For example, other types of differentiating circuits may be employed.

A binary counter embodying this invention is shown in Figure 5. Two trigger circuit stages 64, 66 of the type described above are connected in cascade. As many additional stages as desired may be added after the second stage 66. The second stage 66 and succeeding stages of the counter have a first core unit 68, a second core unit 70 and a delay unit 38 connected as shown in Figure 1. The first stage 64 is the same as shown in Figure 1 except for the first core unit 72. The gate winding 24 on the first core 10 is not required. This winding 24 may be omitted, and the core 10 biased only to point $N_2$ of the graph of Figure 2. The pulse source 18 is connected in parallel to the first core input windings 14 of all the stages 64, 66. The output winding 32 of each stage second core 12 is connected to the first core gate winding 24 of the succeeding stage. All the stages 64, 66 are initially reset by pulses applied to the reset windings 36.

Figure 4:
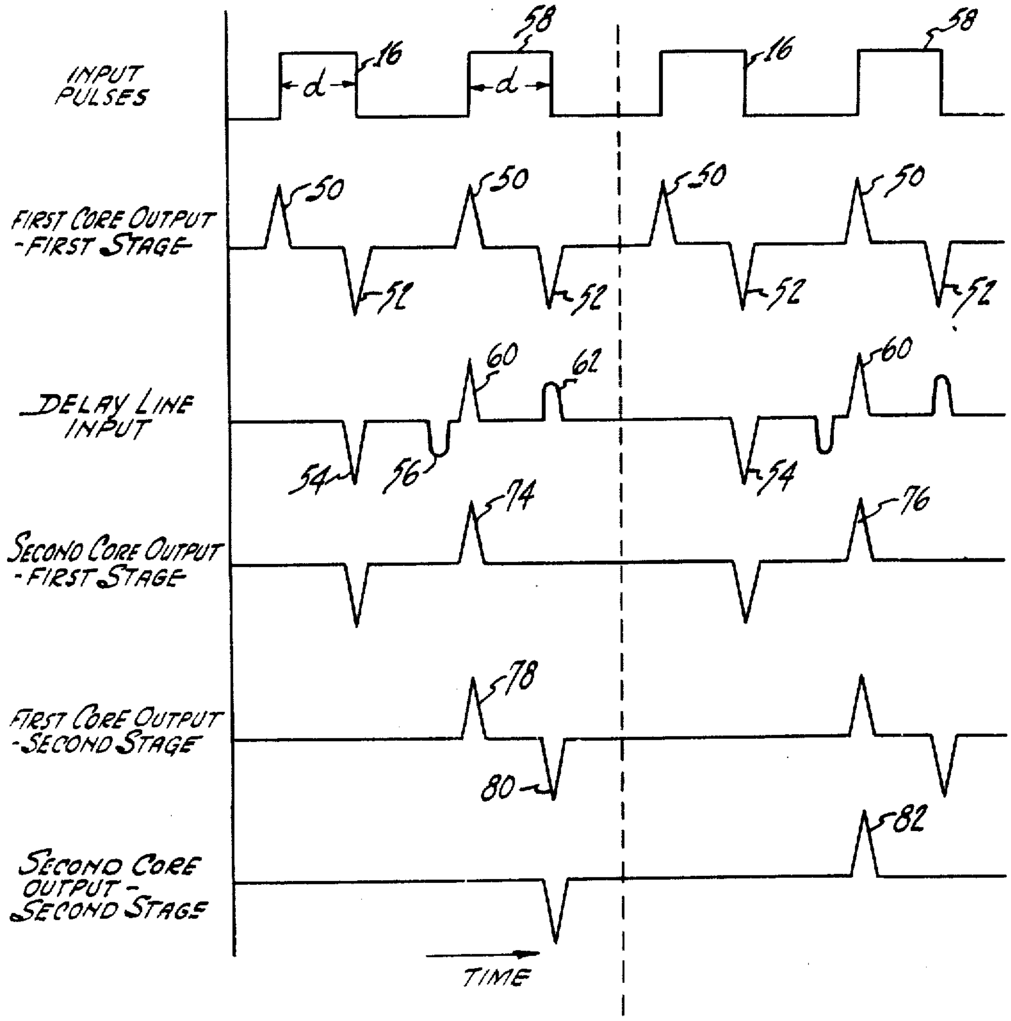
Figure 4 is an idealized graph showing the time relationships of waveforms occurring in the circuits of Figures 1 and 5.

As shown in Figure 4, for each two positive-going input pulses 16, 58, the first trigger-circuit stage 64 produces one positive-going output pulse 74 or 76 that is substantially coincident with the leading edge of the second one 58 of the two input pulses. Thus, as the first stage 64 is triggered back to the reset condition by the second input pulse 58, the first core unit 68 of the second stage 66 receives the first positive-going output pulse 74 as a gating pulse substantially coincident with the leading edge of the second input pulse 58. The first core unit 68 produces a pulse pair 78, 80, in the manner described above, the negative pulse 80 of which sets the second core unit 70 of the second stage. The second positive-going output pulse 76 from the first stage 64 is coincident with the leading edge of a fourth input pulse 58 and triggers the second stage 66 back to the reset condition. As the second stage 66 is reset, it produces a positive-going output pulse 82 which is used to gate the third stage (not shown). Thus, for each two input pulses 16, 58, the first stage 64 transfers a positive pulse 74 to the second stage 66. For each two such transferred pulses 74 and 76 the second stage 66 transfers a pulse 82 to the third stage (not shown) and so on. Thus, the circuit of Figure 5 operates as a binary counter.

A modified form of trigger circuit embodying this invention is shown in Figure 6. The first and second cores 10 and 12 may be connected in the same manner shown in Figure 1. Parts corresponding to those previously described are referenced by the same numerals. In addition, there is a third core 84 made of material that has a thin, substantially Z-shaped hysteresis curve as shown in Figure 7. This material has a low retentivity tending to return to the unsaturated condition when the magnetizing force is removed. The core has a relatively high inductance when operating in the central unsaturated region, $B_u$ and a low or negligible inductance when operating in the saturated region $B_s$ of the curve. A bias winding 86 linked to the third core 84 and a D.-C. source 88 bias the core 84 in the positive direction to point 89 in the high inductance region $B_u$ as shown in Figure 7. A delay winding 90 linked to the core 84 is connected at one end to an end of the second core second winding 30. Capacitances 92 are connected between different turns of the winding 90 and a lead to the other end of the winding 30. Connected across the last capacitance 92 is a terminating impedance 94 that is substantially equal to the characteristic impedance of the effective delay line 95 that is formed by the inductance of the core 84 (when in the high inductance region) and the capacitances 92. The amount of delay associated with this effective delay line is equal to the time *d*, the duration of the input pulse 16, when the core 84 is operating in the high inductance region.

With core 12 initially in the reset condition, state P, the positive-going pulse 50 of the pulse pair 50, 52 has substantially no effect since the pulse tends to drive the second core 12 further to saturation in state P. The negative-going pulse 52, at time *d* later, drives the core 12 to state N inducing a negative-going pulse in the winding 30. This induced pulse, as it enters the winding 90, produces a magnetizing force that drives the core 84 in the opposite direction from that of the bias. At time *d* after pulse 52, the induced pulse has travelled down to the end of the effective delay line 95 and core 84 has been driven to point 96 in the high inductance region. The core 84 then returns to its original biased condition 89 in a time determined by the biasing magnetizing force and the fall-off time of the delayed induced pulse. A pulse induced in the winding 90 when the core 84 returns to the biased state 89 has insufficient amplitude at any instant to change the state of the second core 12. Core material having a thin hysteresis curve, as shown in Figure 7, is preferred in order that the core 84 returns to substantially the same bias point 89 after excursions around minor hysteresis loops.

The positive-going pulse 50 of the next pulse pair finds the core 12 in state N and drives it to state P. The induced pulse in the winding 30 drives the third core 84 to a point 98 in the saturated region over the delay period *d*. At time *d*, the core 84 dwells in the region 98 of negligible inductance. Therefore, when the negative-going pulse 52 arrives at the winding 28, the delay line 95 offers substantially no delay to transfer of energy from that pulse 52. The load across the winding 30, at this time *d*, is of relatively low impedance because of the low inductance of the core 84 as it dwells in region 98. Accordingly, the current due to the pulse 52, in trying to return the third core to its biased condition 89, tends to be absorbed in the low-impedance load 95 across the winding 30. The remaining energy in the pulse 52 is insufficient to return the second core 12 to state N, and the core 12 remains in state P. The pulse induced in winding 90 as the third core 12 returns to the biased condition does not have enough energy to change the state of the second core 12.

The circuit of Figure 6 operates as a triggerable flip-flop. A first input pulse 16 has the effect of setting the second core 12 to state N, and the succeeding input pulse resets the core to state P. When the first pulse 50 of the pulse pair does not change the state of the core 12, the third core circuit 95 does not affect the setting action of the second pulse 52. When the first pulse 50 resets the core 12, the circuit 95 inhibits the setting action of pulse 52. The flip-flop of Figure 6 may also be employed in a counter in a manner similar to that described above in connection with Figure 5 for the flip-flop of Figure 1.

It is seen from the above description of this invention that an improved magnetic device is provided that has a binary mode of operation and may be used in digital information systems. The magnetic device may be employed as a triggerable flip-flop, and a plurality of such devices may be connected in cascade to provide a binary counter.

What is claimed is:

1. A magnetic device comprising a magnetic element characterized by having two substantially stable magnetic states, means linked to said element for applying a first magnetizing force to said element tending to drive said element from an initial state and, at a predetermined time after the application of said first force, a second magnetizing force tending to drive said element back towards said initial state, and means linked to said element and responsive to said element being driven from said initial state for inhibiting the effect of said second force.

2. A magnetic device as recited in claim 1 wherein said means for inhibiting the effect of said second force includes means for applying to said element at said predetermined time a magnetizing force to oppose said second force.

3. A magnetic device as recited in claim 1 wherein said means for inhibiting the effect of said second force includes means for providing at said predetermined time a low impedance load linked to said magnetic element.

4. A magnetic device comprising a magnetic element characterized by having two substantially stable magnetic states, signal-responsive means including a winding linked to said element for applying a first magnetizing force to said element tending to drive said element from an initial state and a second magnetizing force tending to drive said element back towards said initial state, and means including another winding linked to said element and operative as a result of said element being driven from said initial state for inhibiting the effect of said second force.

5. A magnetic device comprising a magnetic element characterized by having two substantially stable magnetic states, means linked to said element for successively applying two magnetizing forces to said element, each first one of said magnetizing forces tending to drive said element from an initial magnetic state, each second one of said magnetizing forces being applied at a predetermined time after the associated first magnetizing force and tending to drive said element back towards said initial state, and means linked to said element for inhibiting the effect of said second force only when said element is driven from said initial state by said first force and as a result thereof.

6. A magnetic device comprising a magnetic element characterized by two substantially stable magnetic states, means linked to said element for applying pairs of first and second magnetizing forces to said element, each of said first forces tending to drive said element to a first one of said states, each of said second forces being applied a predetermined time after said first force of the same pair and tending to drive said element back to the second one of said states, and means responsive to said element being driven to said first state for opposing the driving of said element back to said second state at said predetermined time.

7. A magnetic device comprising a magnetic element characterized by having two substantially stable magnetic states, winding means linked to said element, means for applying magnetizing forces to said element, means for applying to said winding means a first energizing pulse to produce a magnetizing force tending to drive said element from said initial state and, at a predetermined time after said first pulse, a second energizing pulse to produce a magnetizing force tending to drive said element back towards said initial state, and means for applying an energizing pulse to said winding means to oppose said second pulse at said predetermined time and in response to said element being driven from said initial state.

8. A magnetic device comprising a magnetic element characterized by having two substantially stable magnetic states, a first and a second winding linked to said element, means for successively applying pairs of energizing pulses of opposite polarities to said first winding, each first pulse of said pairs occurring a predetermined time before the second pulse of the same pair, and delay means linked to said second winding and having a delay characteristic corresponding to the time between said opposite-polarity pulses, said delay means being responsive to a pulse induced in said second winding as a result of one of said first pulses for opposing a change in flux in said element said predetermined time later due to said second pulse.

9. A magnetic device as recited in claim 8 wherein said delay means includes a delay line for reflecting a pulse back to said second winding in a sense such as to oppose the magnetizing force associated with said second pulse.

10. A magnetic device as recited in claim 8 wherein said delay means includes means presenting a relatively high impedance load to said second winding at the time of said first pulse and a relatively low impedance at the time of said second pulse of the same pair incident to a pulse induced in said second winding due to said first pulse.

11. A magnetic device as recited in claim 8 wherein said means for successively applying pairs of energizing pulses includes a second magnetic element, an input and an output winding linked to said second element, and means for applying a biasing magnetizing force to said second element, said second element output winding being connected to said first winding.

12. In combination, a plurality of magnetic devices each separately comprising a magnetic element characterized by having two substantially stable magnetic states, signal responsive means linked to said element for applying a first magnetizing force to said element tending to drive said element from an initial state and, at a predetermined time after the application of sa second magnetizing force tending to driv ...ent back towards said initial state, an output w ...g linked to said element, and means linked to said element for inhibiting the effect of said second force incident to said element being driven from said initial state, said output winding of one of said devices being connected to apply actuating signals to said means for applying first and second forces of another of said devices.

References Cited in the file of this patent

UNITED STATES PATENTS

| | | |
|---|---|---|
| 2,710,952 | Steagall | June 14, 1955 |
| 2,713,675 | Schmitt | July 19, 1955 |

U. S. DEPARTMENT OF COMMERCE

PATENT OFFICE

CERTIFICATE OF CORRECTION

Patent No. 2,813,260 November 12, 1957

Martin Kaplan

It is hereby certified that error appears in the printed specification of the above numbered patent requiring correction and that the said Letters Patent should read as corrected below.

Column 3, line 51, for "$H_c$" read -- $-H_c$ --; column 4, line 55, strike out the comma after "region" and insert the same after "$B_u$" in line 56, same column.

Signed and sealed this 1st day of April 1958.

(SEAL)
Attest:

KARL H. AXLINE
Attesting Officer

ROBERT C. WATSON
Commissioner of Patents

Notice of Adverse Decision in Interference

In Interference No. 90,645 involving Patent No. 2,813,260, M. Kaplan, Magnetic device, final judgment adverse to the patentee was rendered July 17, 1964, as to claims 1, 5, 6 and 7.

[*Official Gazette November 24, 1964.*]

Disclaimer 2,813,260.—*Martin Kaplan*, Collingswood, N.J. MAGNETIC DEVICE. Patent dated Nov. 12, 1957. Disclaimer filed Oct. 13, 1964, by the assignee, *Radio Corporation of America*.

Hereby enters this disclaimer to claims 1, 5, 6 and 7 of said patent.

[*Official Gazette January 19, 1965.*]